Figure 3:
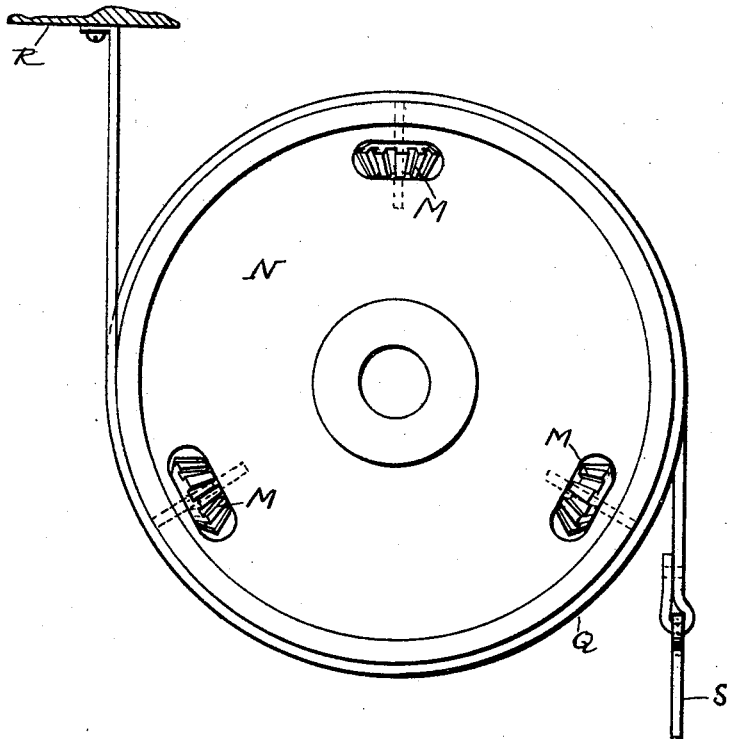

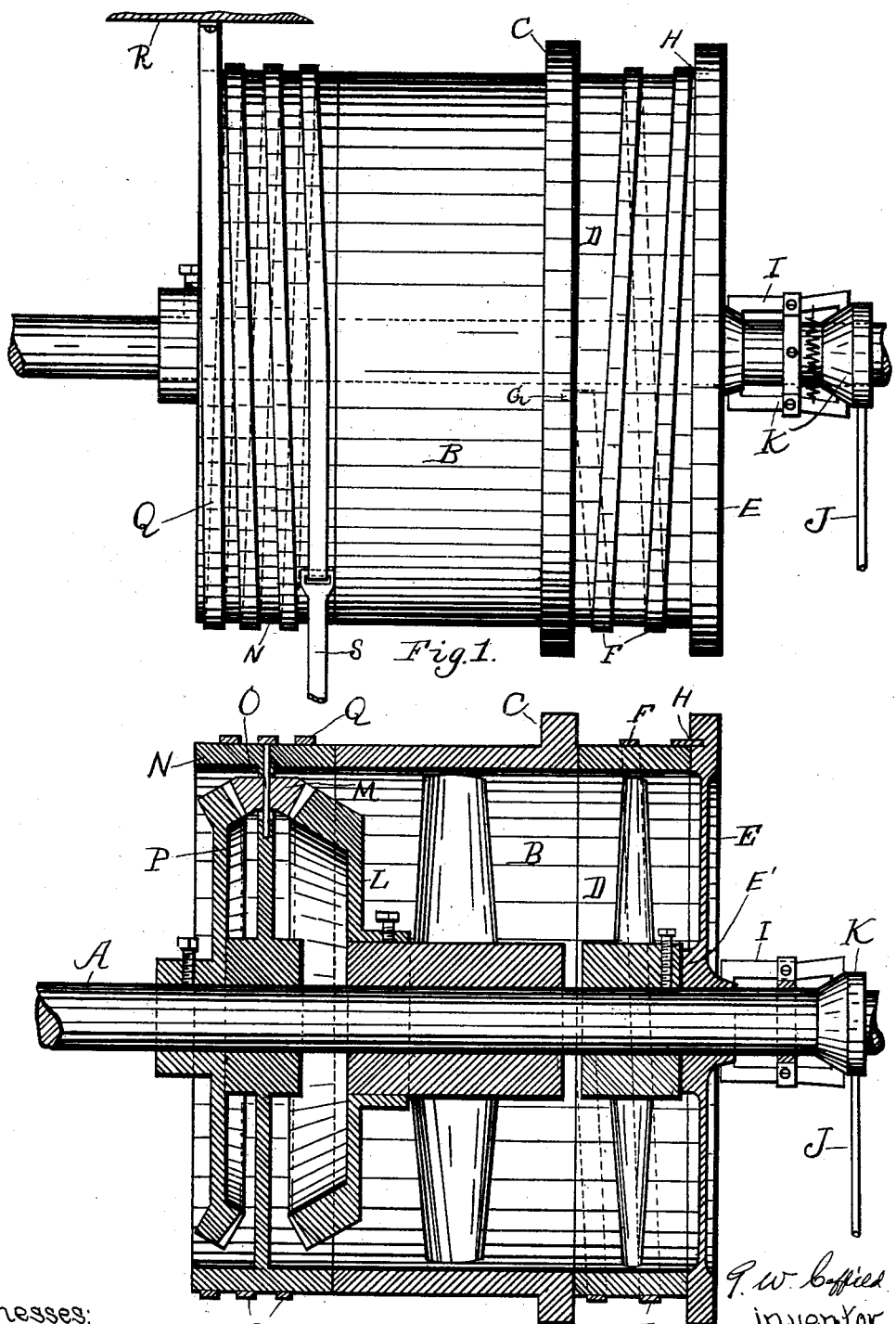

No. 644,061. Patented Feb. 27, 1900.
G. W. COFFIELD.
FRICTION CLUTCH.
(Application filed Oct. 14, 1899.)

(No Model.) 2 Sheets—Sheet 2.

Witnesses:
Carl H. Moe.
C. Theobald.

G. W. Coffield
Inventor.
By R. J. McCarty
Attorney.

UNITED STATES PATENT OFFICE.

GEORGE W. COFFIELD, OF DAYTON, OHIO.

FRICTION-CLUTCH.

SPECIFICATION forming part of Letters Patent No. 644,061, dated February 27, 1900.

Application filed October 14, 1899. Serial No. 733,556. (No model.)

*To all whom it may concern:*

Be it known that I, GEORGE W. COFFIELD, a citizen of the United States, residing at Dayton, in the county of Montgomery and State of Ohio, have invented certain new and useful Improvements in Friction-Clutches; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a reversible shaft-clutch and possesses the novel and useful features hereinafter described and claimed.

Referring to the accompanying drawings, Figure 1 is an elevation of my improved clutch. Fig. 2 is a longitudinal sectional view of the same. Fig. 3 is a side elevation of the wheel upon which are supported the bevel-pinions.

In the detailed description similar letters of reference indicate corresponding parts.

A is a shaft which has a loose pulley B, with side flange C. This pulley is the main element through which power is transmitted to said shaft, as will hereinafter be fully described. To one side of and adjacent to said pulley B is a wheel D, which is fast on the shaft, and adjacent to wheel D is a wheel E, which is loose on said shaft.

F is a metallic band or strap, which spirally encircles the wheel D, one end thereof being connected at G to main pulley B and the other end connected to wheel E at H.

I is an ordinary shifting clutch of well-known construction. This clutch is mounted on the shaft to turn therewith and is movable along the shaft to engage and release hub E' of wheel E. The engagement is effected by moving the shifting block or wheel K in the direction of the hub E'. During such movement the tapering surface of said wheel K acting upon the outer ends of the levers I causes said levers to frictionally engage the hub E'.

The main pulley B has either fast on its hub or an integral part thereof a bevel gear-wheel L, which meshes with three bevel-pinions M, which, it will therefore be seen, are driven constantly by pulley B. The pinions M are mounted equal distances apart on shafts O, which are journaled in pulley N. The latter pulley is adjacent to said pulley B and is loose on the shaft. A bevel gear-wheel P meshes with said pinions M on the side opposite wheel L. This wheel P is fast on the shaft. A metallic band or strap Q is wrapped spirally around wheel N, one end thereof being secured to an immovable part R adjacent to the wheel and the other end secured to a hand-operated tightening-bar S, which when drawn upon is made to frictionally bind the band Q to the wheel N to hold said wheel stationary.

When wheel E is held by clutch-levers I, band F is caused to frictionally bind pulley D. The shaft and entire system of wheels thereon rotate in the same direction with pulley B, band Q being loose. When the clutch-levers I are disengaged, and band Q is tightened by drawing on bar S, the shaft and entire system, with the exception of main pulley B and wheel E, are made to turn in an opposite direction from that first described. These reversed movements may be imparted to the shaft without stopping the power, as will be understood from the foregoing description and the drawings of my invention.

Having described my invention, I claim—

In a reversible friction-clutch, the combination with a single shaft, of a main pulley B loose thereon, an adjacent wheel D tight on said shaft, an end wheel E loose on said shaft, a band F inclosing wheel D and one end of which is secured to the main pulley B and the other end of which is secured to wheel E, clutch devices secured to the shaft and adapted to lock wheel E to the shaft, a wheel N loose on the shaft, bevel-pinions M carried on the interior of said wheel N, a bevel gear-wheel L loose on the shaft, another bevel gear-wheel P tight on said shaft, the said wheels L and P engaging with opposite sides of the pinions M, and a band Q inclosing wheel N one end of said band being secured to a fixed point and the other end being secured to an operating-bar, whereby means are provided for driving the shaft in a direction with the main pulley and for reversing the movement of said shaft, substantially as shown and described.

In testimony whereof I affix my signature in presence of two witnesses.

GEORGE W. COFFIELD.

Witnesses:
JOHN W. KALBFUS,
R. J. MCCARTY.